(12) United States Patent
Ohseki et al.

(10) Patent No.: US 12,289,770 B2
(45) Date of Patent: Apr. 29, 2025

(54) CONTROL APPARATUS SELECTIVELY USING PLURALITY OF ANTENNAS, TERMINAL APPARATUS COMMUNICATING WITH CONTROL APPARATUS, AND COMMUNICATION METHOD

(71) Applicant: KDDI CORPORATION, Tokyo (JP)

(72) Inventors: Takeo Ohseki, Fujimino (JP); Masaaki Ito, Fujimino (JP); Issei Kanno, Fujimino (JP); Kosuke Yamazaki, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 339 days.

(21) Appl. No.: 17/735,400

(22) Filed: May 3, 2022

(65) Prior Publication Data

US 2022/0264654 A1 Aug. 18, 2022

Related U.S. Application Data

(63) Continuation of application No. PCT/JP2020/031973, filed on Aug. 25, 2020.

(30) Foreign Application Priority Data

Nov. 12, 2019 (JP) .................... 2019-204827

(51) Int. Cl.
*H04W 4/00* (2018.01)
*H04L 5/00* (2006.01)
(Continued)

(52) U.S. Cl.
CPC ....... *H04W 74/0833* (2013.01); *H04L 5/0048* (2013.01); *H04W 72/0446* (2013.01); *H04W 72/21* (2023.01)

(58) Field of Classification Search
CPC ................... H04W 74/0833; H04L 5/0048
See application file for complete search history.

(56) References Cited

U.S. PATENT DOCUMENTS 8,699,364 B2 4/2014 Ishii et al.
2008/0019306 A1* 1/2008 Damnjanovic ..... H04W 74/002
370/329
(Continued)

FOREIGN PATENT DOCUMENTS

CN 103533663 B 2/2017
WO WO-2009/157124 A1 12/2009
(Continued)

OTHER PUBLICATIONS

CMCC; "Discussion on 2-step CFRA"; 3GPP TSG-RAN WG2 #108; R2-1915216; Reno, Nevada; Agenda Item 6.13.4; Nov. 22, 2019; 3 pages.
(Continued)

*Primary Examiner* — Elisabeth Benoit Magloire
(74) *Attorney, Agent, or Firm* — Foley & Lardner LLP

(57) ABSTRACT

A control apparatus may wirelessly communicate with a terminal apparatus. When a random access preamble is received from the terminal apparatus, if the random access preamble is not based on a setting notified by the control apparatus, the control apparatus may scramble communication with the terminal apparatus after the random access preamble is received, using a scrambling sequence that is based on second identification information different from first identification information corresponding to the control apparatus.

10 Claims, 4 Drawing Sheets

(51) Int. Cl.
  *H04W 72/0446* (2023.01)
  *H04W 72/21* (2023.01)
  *H04W 74/0833* (2024.01)

(56) References Cited

U.S. PATENT DOCUMENTS

| | | | | |
|---|---|---|---|---|
| 2009/0041240 | A1* | 2/2009 | Parkvall | H04W 72/21 |
| | | | | 380/247 |
| 2015/0373626 | A1* | 12/2015 | Yi | H04B 1/7143 |
| | | | | 375/132 |
| 2018/0063869 | A1* | 3/2018 | Zhang | H04W 72/12 |
| 2018/0255521 | A1* | 9/2018 | Reial | H04W 74/0833 |
| 2019/0373642 | A1 | 12/2019 | Suzuki et al. | |
| 2022/0256618 | A1* | 8/2022 | Liu | H04W 76/30 |
| 2022/0272767 | A1* | 8/2022 | Liu | H04W 74/0833 |

FOREIGN PATENT DOCUMENTS

| | | |
|---|---|---|
| WO | WO-2018/135640 A1 | 7/2018 |
| WO | WO-2018/173447 A1 | 9/2018 |

OTHER PUBLICATIONS

Fujitsu; "On open questions to 2-step CF-RACH"; 3GPP TSG-RAN WG2 Meeting #107bis; R2-1913169; Agenda Item 6.13.6 (2-step RACH—Other); Oct. 14-18, 2019; Chongqing, China; 2 pages.

Japan Patent Office as International Searching Authority; International Search Report; PCT/JP2020/031973; dated Nov. 2, 2020; 5 pages.

Japan Patent Office as International Searching Authority; Written Opinion; PCT/JP2020/031973; dated Nov. 2, 2020; 5 pages.

Karlsson, Marcus et al.; "Techniques for System Information Broadcast in Cell-Free Massive MIMO"; IEEE Transactions on Communications, vol. 67, No. 1; Jan. 2019; pp. 244-257.

Extended European Search report issued in corresponding European Patent Application No. 20886335.7, dated Dec. 22, 2022 (11 pages).

Office Action of corresponding Japanese Patent Application No. 2019-204827, dated Jan. 20, 2023.

* cited by examiner

CONTROL APPARATUS SELECTIVELY USING PLURALITY OF ANTENNAS, TERMINAL APPARATUS COMMUNICATING WITH CONTROL APPARATUS, AND COMMUNICATION METHOD

CROSS-REFERENCE TO RELATED APPLICATION(S)

This application is a continuation of International Patent Application No. PCT/JP2020/031973 filed on Aug. 25, 2020, which claims priority to and the benefit of Japanese Patent Application No. 2019-204827 filed on Nov. 12, 2019, the entire disclosures of which are incorporated herein by reference.

BACKGROUND OF THE INVENTION

Field of the Invention

The present invention relates to a control apparatus, a terminal apparatus, and a communication method and specifically relates to a connection control technique in wireless communication.

Description of the Related Art

A technique is under study in which a plurality of antennas are arranged with high density, and communication with a terminal apparatus is performed using some of the plurality of antennas. With this technique, as a result of different antennas being used for each terminal apparatus, a cell is virtually configured for the terminal apparatus, and the terminal apparatus is approximately present at the center of the virtual cell (refer to M. Karlsson etc., "Techniques for System Information Broadcast in Cell-Free Massive MIMO", IEEE Transaction on Communication, January 2019). According to such a technique, the terminal apparatus can achieve uniform communication quality regardless of the position.

Any procedure for establishing connection has not been determined for performing communication between a terminal apparatus and a base station apparatus in an aforementioned system in which antennas are arranged with high density, and at least some of the antennas are selectively used. Therefore, it is requested to define a procedure for efficiently establishing connection between a base station apparatus and a terminal apparatus.

SUMMARY OF THE INVENTION

The present invention provides a technique for enabling efficient establishment of connection between a base station apparatus and a terminal apparatus, in a system in which some of a plurality of antennas are selected and used for performing communication between the base station apparatus and the terminal apparatus.

A control apparatus according to one aspect of the present invention is a control apparatus that wirelessly communicates with a terminal apparatus, and includes a control unit configured to, when a message corresponding to a random access preamble is received from the terminal apparatus, if the message is not based on a setting notified to the terminal apparatus by the control apparatus, scramble communication with the terminal apparatus after the message was received, using a scrambling sequence that is based on second identification information that is different from first identification information corresponding to the control apparatus.

A terminal apparatus according to another aspect of the present invention includes a communication unit configured to include, in a message corresponding to a random access preamble, identification information for specifying a scrambling sequence to be used by a control apparatus that has received the message to scramble communication with the terminal apparatus, transmit the message, and, after transmitting the message, and perform communication with the control apparatus, the communication being scrambled using the scrambling sequence.

Further features of the present invention will become apparent from the following description of exemplary embodiments with reference to the attached drawings.

DESCRIPTION OF THE EMBODIMENTS

Figure 1:
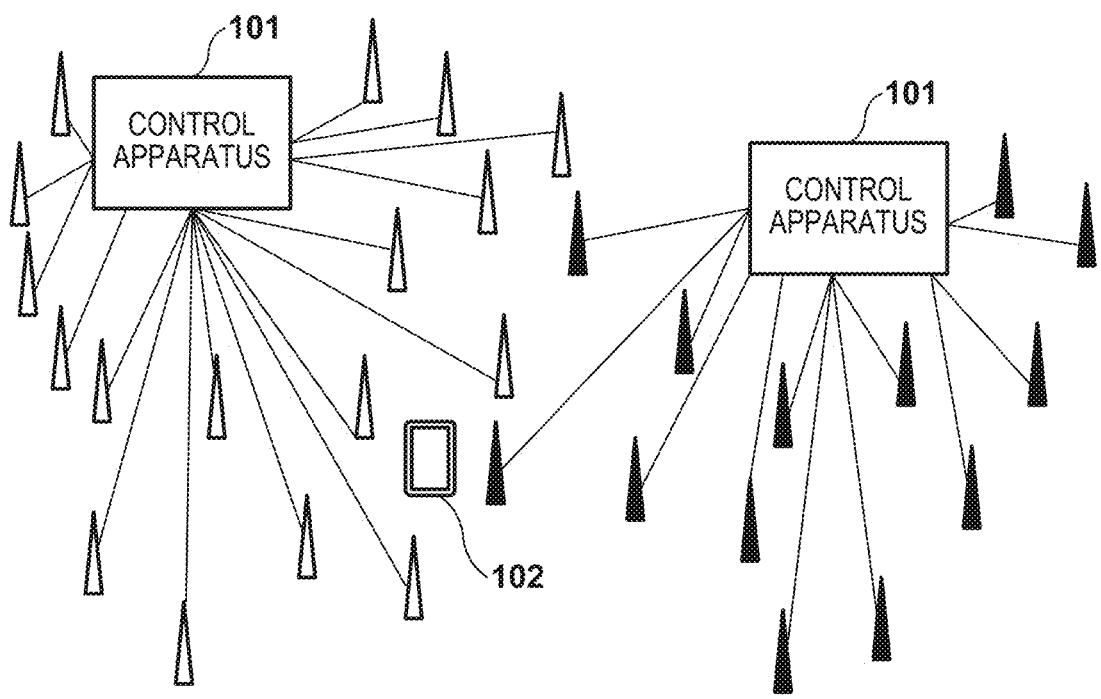
FIG. 1 is a diagram illustrating an exemplary configuration of a wireless communication system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

FIG. 1 shows an exemplary configuration of a wireless communication system according to a present embodiment. As shown in FIG. 1, in the wireless communication system according to the present embodiment, a plurality of antennas are planarly arranged with high density, and the antennas are connected to control apparatuses 101 such as base station apparatuses using optical fibers, for example. A control apparatus 101 connects to a terminal apparatus 102 via at least one antenna and performs communication therewith. Note that, although only a small number of control apparatuses 101 and one terminal apparatus 102 are shown in FIG. 1 in order to simplify the description, there may be of course a larger number of these apparatuses than illustrated in FIG. 1.

Note that, in the following, description will be given assuming that the antennas are arranged in a distributed manner and are connected to the control apparatuses. However, only the antennas may be arranged with high density, or antenna units having an RF processing function such as an RF (radio frequency) filter may also be arranged with high density. The control apparatuses 101 execute communication processing other than the processing to be performed on the antenna side. That is, baseband processing regarding received signals and signal processing in an upper layer thereafter are performed by the control apparatuses 101. As shown in FIG. 1, when constructing a system in which a very large number of antennas are used, it is envisioned that a plurality of control apparatuses 101 are each connected to a plurality of antennas and perform signal transmission and reception, considering a computation load or the like. Note that this system can be configured using a known centralized radio access network (C-RAN), in which each antenna may correspond to a transmission/reception point (TRP) of C-RAN, and the control apparatus 101 may correspond to a baseband unit (BBU) of C-RAN.

The terminal apparatus 102 connects to a control apparatus 101 via an antenna that is present in the vicinity, and performs communication. The control apparatus 101 performs communication with the terminal apparatus 102 using at least some of the antennas that are connected to the control apparatus 101, in a state in which the connection with the terminal apparatus 102 has been established. Here, two or more control apparatuses 101 can establish connection with the terminal apparatus 102 and perform communication in parallel. Accordingly, one or more control apparatuses 101 can configure a virtual area with the terminal apparatus 102 being at the center (may also be referred to as a user centric area), and provide a high quality and highly stable communication service, regardless of the position of the terminal apparatus 102.

In contrast, any study has not been made regarding the processing that is performed when starting establishment of connection in such a system in which a plurality of antennas are used. In a conventional cellular wireless communication system of LTE (long term evolution) or the like, cell-specific scrambling corresponding to identification information of a cell (a cell ID) is applied to a reference signal sequence or user data. Accordingly, interference between cells is randomized, and it is possible to improve the communication quality. In addition, in a conventional cellular wireless communication system, terminal-specific scrambling can be further applied to a reference signal sequence or user data. Due to such terminal-specific scrambling, when different cells corresponding to different cell IDs perform cooperative communication, interference is randomized, and simultaneous transmission in cooperative communication is enabled. On the other hand, when a conventional technique is applied to a system such as that shown in FIG. 1, it is envisioned that, in random access processing (hereinafter, may be referred to as "RACH" or "RACH processing") for establishing connection, after cell-specific scrambling is applied and connection is established, terminal-specific scrambling is set in the terminal apparatus as necessary, and, after this, scrambling specific to that terminal apparatus is applied and communication is performed. However, two or more control apparatuses 101 respectively correspond to different cell IDs, and thus, when the terminal apparatus 102 performs RACH processing, only an antenna that is connected to the control apparatus 101 with which an attempt is made to establish connection through that RACH processing is used. As a result, it is not possible to sufficiently improve the communication quality of the RACH processing performed by the terminal apparatus 102 by using a large number of antennas, and the probability that the RACH processing will fail can increase. In addition, after the terminal apparatus 102 performs RACH processing and is then connected to a predetermined control apparatus 101, until a scrambling sequence specific to the terminal apparatus 102 is shared by two or more control apparatuses 101 that perform communication with that terminal apparatus 102, it is not possible to provide high-quality communication to the terminal apparatus 102. In view of such a situation, the present embodiment provides a technique for improving a method to be used when the terminal apparatus 102 establishes initial connection with one or more control apparatuses 101.

In the present embodiment, a first control apparatus determines whether or not a random access preamble received from the terminal apparatus 102 (for example, included in a message A of two-step RACH, or as a message 1 of four-step RACH) is based on a setting notified from the first control apparatus itself to the terminal apparatus. If the random access preamble is based on the setting of the first control apparatus, then, after this, the first control apparatus performs communication using a first scrambling sequence corresponding to a first cell ID of the first control apparatus itself. On the other hand, if the random access preamble is not based on the setting notified from the first control apparatus itself to the terminal apparatus, then, in communication after this, the first control apparatus does not use the first scrambling sequence corresponding to the first cell ID, but uses a second scrambling sequence corresponding to a second cell ID.

The second cell ID can be the cell ID of a second control apparatus that is in a neighboring relationship with the first control apparatus, for example. Accordingly, the first control apparatus can perform communication with the terminal apparatus 102 that has transmitted the random access preamble to the second control apparatus, using the scrambling sequence corresponding to the cell ID of the second control apparatus. Accordingly, the first control apparatus and the second control apparatus can cooperate with each other to execute processing after transmission of a response message to the random access preamble, and it is possible to improve the reliability of RACH processing. In addition, as a result of the scrambling sequence corresponding to the second cell ID being used also after RACH processing, there is no need to newly set a scrambling sequence specific to the terminal apparatus 102. For this reason, it is possible to provide a high-quality wireless communication service to the terminal apparatus 102 immediately after connection is established.

Note that, for example, a first control apparatus can acquire, in advance, information regarding a cell ID from a control apparatus for which a neighboring relationship is set, and hold the information. In addition, for example, a configuration may be adopted in which, when a random access preamble is received, if the random access preamble is not based on the setting notified from the first control apparatus to the terminal apparatus, the first control apparatus transmits the random access preamble to a second control apparatus that is in a neighboring relationship therewith, inquires about a cell ID, and acquires a second cell ID. If, for example, the received random access preamble is based on the setting notified from the second control apparatus to the terminal apparatus, the second control apparatus can perform notification of the second cell ID thereof. Note that a configuration may be adopted in which a control apparatus holds, in advance, information regarding cell IDs related to one or more second control apparatuses, and, by transmitting a random access preamble, acquires only a response as to whether or not the random access preamble is based on the setting notified to the terminal apparatus by the second control apparatus to which the inquiry was made. In this case, the control apparatus that has received the inquiry may notify "ACK" as a response to the control apparatus that has made the inquiry if the received random access preamble is based on the setting notified from the control apparatus (that has received the inquiry) to the terminal apparatus, and notify "NACK" if not. Note that information of a small number of bits such as one bit indicating whether or not the random access preamble is based on the setting notified from the control apparatus that has received the inquiry to the terminal apparatus, other than ACK/NACK, may be transmitted/received. In addition, the first control apparatus may store a cell ID and setting information such as a seed for generating a sequence of a random access preamble (information that enables a random access preamble to be specified) in association, for each of one or more second control apparatuses. In this case, the first control apparatus specifies which control apparatus the received random access preamble is associated with, for example, by performing correlation detection using a sequence that is based on a seed associated with the second control apparatus in addition to a sequence that is based on a seed associated with the first control apparatus itself. When a random access preamble is detected based on a seed associated with an apparatus other than the first control apparatus, the first control apparatus specifies the cell ID stored in association with that seed, and, in communication after this, uses a scrambling sequence corresponding to the specified cell ID.

In addition, for example, in PUSCH (Physical Uplink Shared Channel) that is transmitted in a message A of two-step RACH in addition to the random access preamble, the terminal apparatus 102 may transmit a virtual cell ID. In this case, the first control apparatus can use this virtual cell ID as the above-described second cell ID regardless of whether or not the destination of the random access preamble is the first control apparatus itself. Accordingly, starting from transmission of a message B after the message A has been received, the control apparatus that has received the message A uses a scrambling sequence that is based on this virtual cell ID as a scrambling sequence specific to the terminal apparatus, and a plurality of control apparatuses can cooperate to transmit a signal. Note that it suffices that information that is notified from the terminal apparatus is any information that enables a scrambling sequence to be specified, and the information does not need to be a virtual cell ID.

As described above, in the present embodiment, starting from a response to transmission of a random access preamble of RACH processing, a plurality of control apparatuses can use a shared scrambling sequence, and thus it is possible to improve the wireless quality during RACH processing, and provide a high-quality communication environment to a terminal apparatus promptly after connection is established.

Apparatus Configuration

Figure 2:
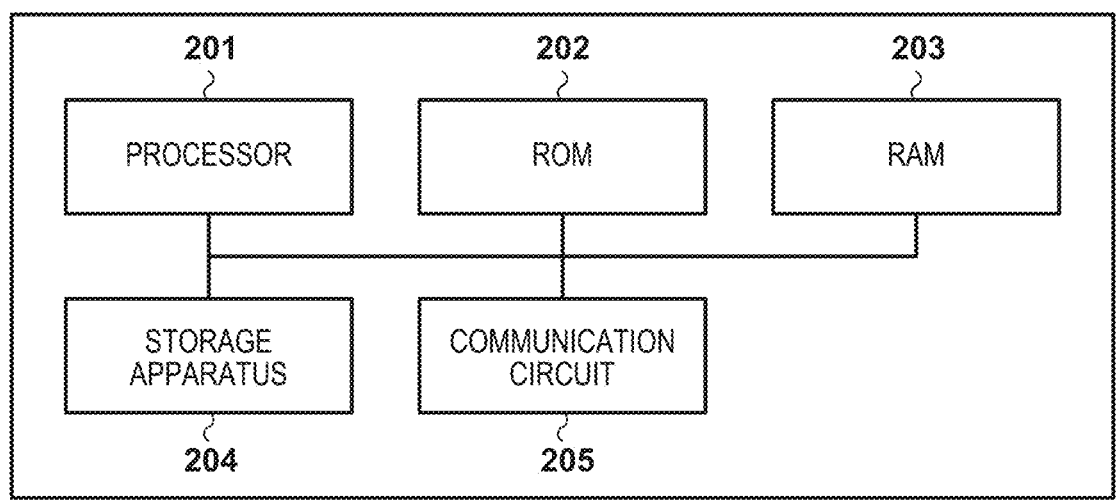
FIG. 2 is a diagram illustrating an exemplary hardware configuration of a control apparatus and a terminal apparatus.

Next, the configuration of the control apparatus that executes processing described above will be described. Note that the terminal apparatus can have a similar configuration. FIG. 2 shows an exemplary hardware configuration of the control apparatus. The control apparatus includes a processor 201, a ROM 202, a RAM 203, a storage apparatus 204, and a communication circuit 205, in one example. In the control apparatus, a computer readable program for realizing the functions of the control apparatus, which is recorded in any of the ROM 202, the RAM 203, and the storage apparatus 204, for example, is executed by the processor 201. Note that the processor 201 may be replaced by one or more processors such as an ASIC (application specific integrated circuit), an FPGA (field programmable gate array), and a DSP (digital signal processor).

The control apparatus performs communication with a partner apparatus (e.g., a terminal apparatus, another control apparatus, an upper node, or the like) by the processor 201 controlling the communication circuit 205, for example. Note that, a schematic diagram in which the control apparatus includes one communication circuit 205 is shown in FIG. 2, however there is no limitation thereto. For example, the control apparatus may include a communication apparatus for communicating with a terminal apparatus and a communication apparatus for communicating with another control apparatus or an upper node.

Figure 3:
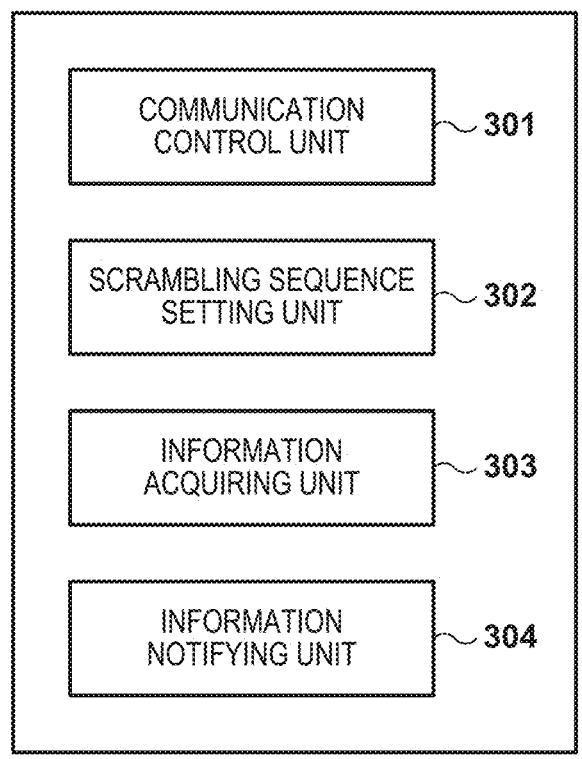
FIG. 3 is a diagram illustrating an exemplary functional configuration of the control apparatus.

FIG. 3 shows an exemplary functional configuration of the control apparatus. The control apparatus includes, for example, a communication control unit 301, a scrambling sequence setting unit 302, an information acquiring unit 303, and an information notifying unit 304. The communication control unit 301 controls communication with a terminal apparatus. The communication control unit 301 receives a random access preamble from the terminal apparatus, and transmits a random access response (for example, included in the message B of two-step RACH, or as a message 2 in four-step RACH) in response to that, for example, and thereby establishes connection with the terminal apparatus.

The scrambling sequence setting unit 302 sets settings of a scrambling sequence that is to be used. If, for example, the random access preamble is not based on the setting notified to the terminal apparatus by the control apparatus, the scrambling sequence setting unit 302 of the control apparatus sets settings of the communication control unit 301 such that a scrambling sequence that is based on a second cell ID that is different from a first cell ID of the control apparatus is used. The second cell ID can be a cell ID of another control apparatus that is in a neighboring relationship, for example. Note that, if PUSCH included in the message A from the terminal apparatus includes a virtual cell ID, the scrambling sequence setting unit 302 sets the communication control unit 301 such that a scrambling sequence that is based on the virtual cell ID. Note that, if notification of such a virtual cell ID has been performed, the scrambling sequence setting unit 302 can set settings of the communication control unit 301 such that a scrambling sequence that is based on the virtual cell ID is used, regardless of whether or not the random access preamble is based on the setting notified to the terminal apparatus by the control apparatus. On the other hand, if notification of a virtual cell ID has not been performed, and the random access preamble is not based on the setting notified to the terminal apparatus by the control apparatus, the scrambling sequence setting unit 302 of the control apparatus can set the settings of the communication control unit 301 such that a scrambling sequence that is based on the cell ID of the control apparatus is used.

The information acquiring unit 303 acquires the aforementioned second cell ID. An inquiry that includes the random access preamble is transmitted to another control apparatus that is in a neighboring relationship, for example. The information acquiring unit 303 then specifies whether or not the received random access preamble is based on the setting notified to the terminal apparatus by this other control apparatus, by receiving a response to the inquiry. If the received random access preamble is based on the setting notified to the terminal apparatus by this other control apparatus, the information acquiring unit 303 uses the cell ID of this other control apparatus as the second cell ID. Note that the information acquiring unit 303 may acquire, from another control apparatus, information indicating only whether or not the received random access preamble is based on the setting notified to the terminal apparatus by this other control apparatus, or may acquire the cell ID itself of this other control apparatus. When a similar inquiry is given from another control apparatus, the information notifying unit 304 notifies the other control apparatus that has made the inquiry, of the cell ID and information indicating whether or not the random access preamble included in the inquiry is based on the setting notified to the terminal apparatus by the control apparatus (that has received the inquiry). Note that a configuration can be adopted in which, for example, the information acquiring unit 303 stores seeds of random access preambles and cell IDs in association, specifies which seed the received random access preamble corresponds to, and specifies the cell ID associated with the specified seed as the second cell ID.

Figure 4:
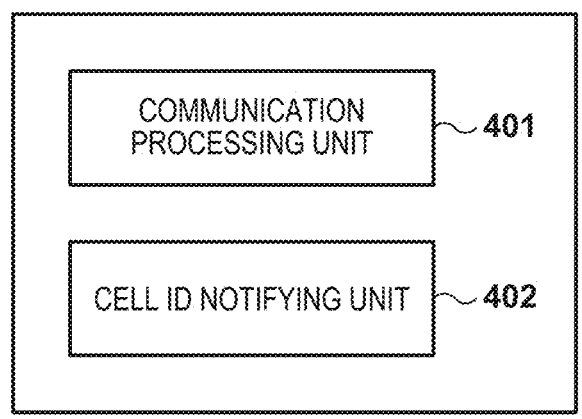
FIG. 4 is a diagram illustrating an exemplary functional configuration of the terminal apparatus.

FIG. 4 shows an exemplary functional configuration of the terminal apparatus that adds a virtual cell ID to the message A of two-step RACH and transmits the message A. The terminal apparatus includes a communication processing unit 401 and a cell ID notifying unit 402, for example. The communication processing unit 401 establishes connection with a control apparatus, and performs wireless communication. The cell ID notifying unit 402 transmits the message A in which the PUSCH portion includes the virtual cell ID, to a nearby control apparatus. Note that the virtual cell ID is exemplary, and any information that enables a scrambling sequence specific to the terminal apparatus to be specified may be notified to the control apparatus.

Processing Flow

Next, some examples of the processing flow to be executed in the wireless communication system according to the present embodiment will be described. Note that description of the details may be omitted regarding the operations described above. Note that detailed description above is not repeated here, and only the processing flow will be schematically described.

Figure 5:
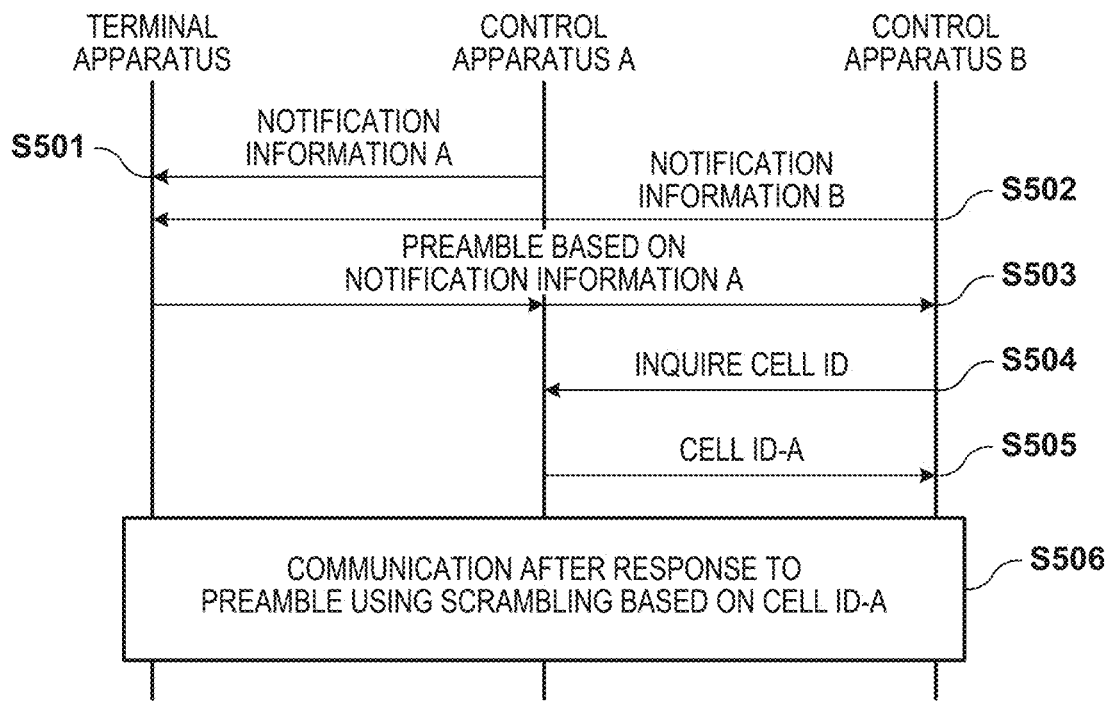
FIG. 5 is a diagram illustrating an example of a flow of processing to be executed in the wireless communication system.

FIG. 5 shows a first example of the processing flow. First, each of the control apparatuses transmits notification information that includes parameters to be used for transmitting a random access preamble for the control apparatus itself (S501, S502). Note that the parameters include information regarding a seed for generating a sequence of a random access preamble, information regarding the time/frequency resource for transmitting the random access preamble, and the like. The terminal apparatus then transmits the random access preamble (that is included in the message A of two-step RACH, or as the message 1 of four-step RACH, for example) to the control apparatus A, for example, based on notification information A received from the control apparatus A (S503). The control apparatus A receives the random access preamble that is based on the notification information A provided from the control apparatus A itself, and, after this, the control apparatus A thereby scrambles communication with the terminal apparatus using a scrambling sequence that is based on the cell ID (the cell ID-A) of the control apparatus A (S506). On the other hand, the control apparatus B receives the random access preamble that is based on the notification information A that is different from notification information B provided from the control apparatus B itself, and thus, the control apparatus B attempts to acquire the cell ID, for example, by making an inquiry that includes the random access preamble to another control information that is in a neighboring relationship (S504). The control apparatus B then receives, from the control apparatus A that transmitted the notification information A used for generating the random access preamble, the cell ID of the control apparatus A (the cell ID-A) (S505). Note that the control apparatus B can also make a similar inquiry to another control apparatus, but this other control apparatus does not correspond to the random access preamble that is based on notification information thereof, and thus does not perform notification of the cell ID (not illustrated). After this, the control apparatus B scrambles communication with the terminal apparatus using the scrambling sequence that is based on the cell ID acquired in S505 (the cell ID-A) (S506). In this technique, by inquiring about the cell ID each time, it is possible to flexibly handle a change in the neighboring relationship between control apparatuses and the like.

Figure 6:
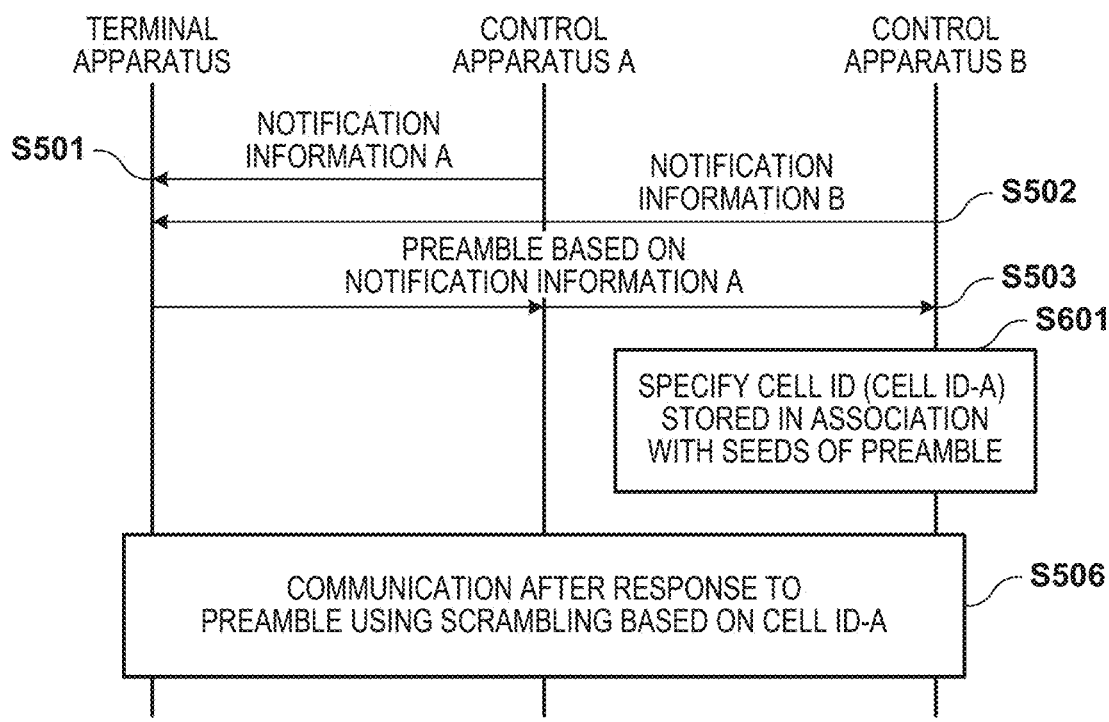
FIG. 6 is a diagram illustrating an example of a flow of processing to be executed in the wireless communication system.

Note that each control apparatus may store, therein, information including information regarding a random access preamble (for example, a sequence of a random access preamble itself or a seed for generating the sequence) and a cell ID associated with each other, and may specify a cell ID based on a received random access preamble. FIG. 6 shows an example of the processing flow in this case. In FIG. 6, the control apparatus B executes processing for specifying the cell ID corresponding to the received random access preamble, from the information stored therein (S601) instead of performing S504 and S505 in FIG. 5. With this technique, there is no need to make an inquiry, and thus it is possible to reduce the processing time.

Figure 7:
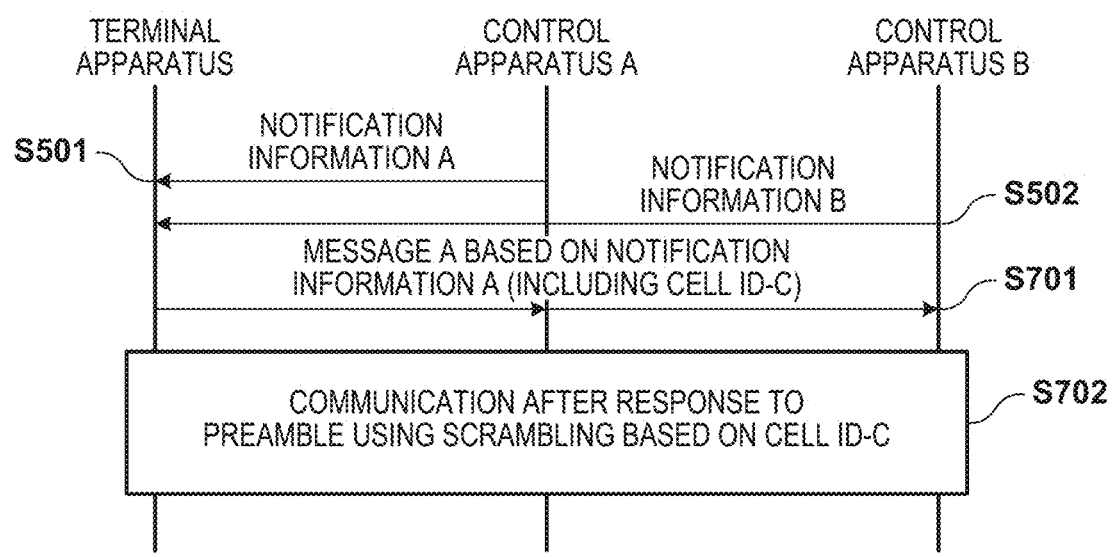
FIG. 7 is a diagram illustrating an example of a flow of processing to be executed in the wireless communication system.

In addition, a configuration may be adopted in which the terminal apparatus adds a virtual cell ID to be used for generating a scrambling sequence to the message A of two-step RACH and transmits the message, and the control apparatus perform communication using the scrambling sequence that is based on that virtual cell ID. FIG. 7 shows an example of this processing flow. In FIG. 7, the terminal apparatus transmits a message A that includes a random access preamble that is based on notification information A provided from the control apparatus A and PUSCH that includes a cell ID-C as a virtual cell ID (S701). The control apparatus A then detects the random access preamble based on parameters transmitted in the notification information A by the control apparatus A itself, and acquires the cell ID-C from next PUSCH. In addition, for example, as shown in FIG. 6, the control apparatus B acquires, in advance, information regarding a seed for generating a preamble sequence of a random access preamble to be used by another control apparatus that is in a neighboring relationship, and the like, and thereby acquires information similar to information that is notified using the notification information A. Similarly to the control apparatus A, the control apparatus B then detects the random access preamble, and acquires the cell ID-C from next PUSCH. The control apparatus A and the control apparatus B then perform communication after that using a scrambling sequence that is based on the notified cell ID-C (S702).

According to the above-described processing examples, a plurality of control apparatuses can use a shared scrambling sequence, from a response to transmission of a random access preamble of RACH processing. For this reason, it is possible to improve the wireless quality during RACH processing, and to provide a high-quality communication environment to the terminal apparatus promptly after connection is established.

According to the present invention, connection between a base station apparatus and a terminal apparatus can be efficiently established, in a system in which some of a plurality of antennas are selected and used for performing communication between the base station apparatus and the terminal apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control apparatus that wirelessly communicates with a terminal apparatus, the control apparatus comprising:
at least one processor; and
at least one memory that stores a computer-readable instruction for causing, when executed by the at least one processor, the at least one processor to:
notify the terminal apparatus of a setting of a random access preamble used for connecting to the control apparatus; and
based on receiving a random access preamble from the terminal apparatus and the random access preamble not being based on the setting, scramble communication with the terminal apparatus after the random access preamble is received, using a scrambling sequence that is based on second identification information different from first identification information corresponding to the control apparatus,
wherein based on the random access preamble being based on another setting notified by another control apparatus, the control apparatus uses identification information corresponding to the other control apparatus as the second identification information.

2. The control apparatus according to claim 1, wherein the control apparatus uses identification information notified in a message that includes the random access preamble from the terminal apparatus, as the second identification information.

3. The control apparatus according to claim 2, wherein the message is a message A in two-step random access processing, and the terminal apparatus is notified of identification information that is to be used as the second identification information, in a physical uplink shared channel portion of the message A.

4. The control apparatus according to claim 2, wherein, when notification of identification information is made in the message from the terminal apparatus, even if the random access preamble is based on the setting notified by the control apparatus, communication with the terminal apparatus after receiving the random access preamble is scrambled using a scrambling sequence that is based on the second identification information.

5. The control apparatus according to claim 1, wherein the computer-readable instruction further causes, when executed by the at least one processor, the at least one processor to transmit an inquiry that includes the random access preamble, to the other control apparatus, and acquire the second identification information.

6. The control apparatus according to claim 1, wherein the computer-readable instruction further causes, when executed by the at least one processor, the at least one processor to, when an inquiry that includes a random access preamble is received from another control apparatus, notify the other control apparatus of information indicating whether or not the random access preamble is based on the setting notified by the control apparatus.

7. The control apparatus according to claim 1, wherein the computer-readable instruction further causes, when executed by the at least one processor, the at least one processor to store, for each of one or more other control apparatuses, information that enables a random access preamble that is based on a setting notified by the each of one or more other control apparatuses to be specified and identification information corresponding to the each of one or more other control apparatuses in association with each other,
wherein, the control apparatus specifies a control apparatus that notified a setting on which the received random access preamble is based, from among the one or more other control apparatuses, and uses identification information corresponding to the specified apparatus as the second identification information.

8. A terminal apparatus comprising:
at least one processor; and
at least one memory that stores a computer-readable instruction for causing, when executed by the at least one processor, the at least one processor to:
receive, from each of a first control apparatus and a second control apparatus, information including a setting regarding a random access preamble;
include, in a message that includes the random access preamble, second identification information different from first identification information corresponding to the first control apparatus and for the first control apparatus and the second control apparatus that have received the message to specify a scrambling sequence that is to be used for scrambling communication with the terminal apparatus;
transmit the message; and
after transmitting the message, perform communication with the first control apparatus and the second control apparatus, communication being scrambled using the scrambling sequence specified by the second identification information.

9. The terminal apparatus according to claim 8, wherein the message is a message A in two-step random access processing, and the terminal apparatus performs notification of the second identification information, in a physical uplink shared channel portion of the message A.

10. A communication method that is executed by a control apparatus that wirelessly communicates with a terminal apparatus, the communication method comprising:
notifying the terminal apparatus of a setting of a random access preamble used for connecting to the control apparatus; and
based on receiving a random access preamble from the terminal apparatus and the random access preamble not being based on the setting, scrambling communication with the terminal apparatus after the random access preamble is received, using a scrambling sequence that is based on second identification information different from first identification information corresponding to the control apparatus,
wherein based on the random access preamble being based on another setting notified by another control apparatus, the control apparatus uses identification information corresponding to the other control apparatus as the second identification information.

* * * * *